United States Patent
Hara et al.

[11] Patent Number: 5,832,007
[45] Date of Patent: Nov. 3, 1998

[54] APPARATUS FOR AND METHOD OF GENERATING X-RAY LASER

[75] Inventors: Tamio Hara; Naohiro Yamaguchi; Toshio Sata, all of Nagoya, Japan

[73] Assignees: Toyota Jidosha Kabushiki Kaisha; Toyota School Foundation; Denso Corporation, all of, Japan

[21] Appl. No.: 803,245

[22] Filed: Feb. 20, 1997

[30] Foreign Application Priority Data

Feb. 23, 1996 [JP] Japan ..................... 8-036448

[51] Int. Cl.⁶ ........................................ H01S 3/30
[52] U.S. Cl. .................... 372/5; 372/31; 372/76; 372/103; 372/99
[58] Field of Search ............... 372/5, 31, 6, 103, 372/99

[56] References Cited

U.S. PATENT DOCUMENTS

| | | | |
|---|---|---|---|
| 4,206,364 | 6/1980 | Dixonetal .................... | 372/5 |
| 4,704,718 | 11/1987 | Suckewer ..................... | 372/76 |
| 5,151,928 | 9/1992 | Hirose ......................... | 372/5 |
| 5,293,396 | 3/1994 | Tomie .......................... | 372/5 |

FOREIGN PATENT DOCUMENTS

| | | |
|---|---|---|
| 4-67599 | 3/1992 | Japan . |
| 6-275893 | 9/1994 | Japan . |
| 7-94296 | 4/1995 | Japan . |

OTHER PUBLICATIONS

Nikkei Science, Feb. 1989, pp. 18–25—"Soft X–ray Laser".

*Primary Examiner*—Leon Scott, Jr.
*Attorney, Agent, or Firm*—Finnegan, Henderson, Farabow, Garrett & Dunner, L.L.P.

[57] ABSTRACT

An X-ray laser generating apparatus comprises a laser oscillator for generating a pulse laser beam, a pulse train converter for converting the pulse laser beam into a pulse train laser beam, an optical device for focusing the pulse train laser beam to a thin line, a target material placed at the laser beam focused position and generating high temperature plasma containing highly charged ions with irradiation of the linearly focused pulse train laser beam, a vacuum chamber for keeping a vicinity of the irradiated region of the target material under a decompressed state, and a pair of X-ray reflecting mirrors positioned on both sides of the target material and on the extended thin line, and at least one of the paired mirrors partially transmits X-ray.

11 Claims, 7 Drawing Sheets

APPARATUS FOR AND METHOD OF GENERATING X-RAY LASER

BACKGROUND OF THE INVENTION

1. Field of the invention

This invention relates to a technique for generating X-ray laser, and more particularly to a technique in which X-ray laser can be generated by a small-sized laser oscillator.

2. Description of the Prior Art

A technique for generating X-ray laser by utilizing a laser beam has come to be developed (Nikkei Science, February 1989, page 18, X-ray laser). In this technique, as illustrated in FIG. 1, high power pulse laser beams 11 and 12 are focused to a thin line to irradiate the surfaces of a target material 13. Selenium is used, for example, as a target material 13 which, with irradiation of the high power density laser beams 11 and 12, produces high temperature plasma 14 containing highly charged ions. In the plasma 14, free-electrons with high energies collide with the highly charged ions to create a population inversion, thus bringing about stimulated emission of X-rays 15 and 16.

This technique is a very promising one to generate X-ray laser with irradiation of laser beams, but needs a very large laser oscillation system to obtain high power laser beams 11 and 12 due to its extremely low efficiency of X-ray laser generation. Presently, a gymnasium-sized scale is required for the system.

Later, techniques to enhance the X-ray laser generation efficiency have been developed, and one of which is disclosed, for example, in Japanese Laid-Open Patent Publication No. 6-275893. In this technique, as illustrated in FIG. 2, electrical discharge is generated between a pair of discharge electrodes 27 and 28 provided on both sides of a target material 23. Thus, a state of population inversion is created in plasma 24 with both the energies of the electrical discharge and a laser beam 22. With this technique, the intensity of the laser beam 22 is not required to be very large, thus permitting X-ray laser generation with a small-sized laser oscillator, for example, a YAG laser oscillator. This technique needs discharge electrodes besides the laser oscillator and this makes the device complicated.

SUMMARY OF THE INVENTION

The inventors of the present invention developed a technique in which X-ray laser can be generated not only with a small-sized laser oscillator but also with energy only from laser beam without using other energy such as electrical discharge energy and the like.

The present invention is schematically illustrated in FIGS. 3(A) and 3(B). In this invention, a pulse laser beam 30 is once converted into a pulse train laser beam 31 before irradiating a target material 33. Then, the pulse train laser beam 31 is focused to a thin line to irradiate the surface of the target material 33.

The target material 33 is remarkably enhanced in plasma-creation efficiency, when being sequentially irradiated with pulses of the converted pulse train laser beam 31 instead of being irradiated with a single pulse laser beam 30. This is a phenomenon discovered by the inventors of the present invention as disclosed in Japanese Laid-Open Patent Publication No. 4-67599.

The inventors studied further and found that the conversion of the pulse laser beam 30 into the pulse train laser beam 31 extends the practical laser beam irradiation time from T30 to T31 and consequently extends a duration of stimulated emission of X-ray at high efficiency. When a resonance system is provided such that a pair of X-ray-reflecting mirrors are set on both sides of the target material 33, the extended duration of the stimulated emission increases the number of X-ray round trip between the paired mirrors. Thus, an intense resonance could be obtained, and X-ray laser is generated at high efficiency.

This invention is achieved by the above-described two different knowledge, one of which is that the plasma-creation efficiency is enhanced by using a pulse train laser beam instead of a single pulse laser beam, and the other of which is that, by the extended duration of the stimulated emission caused by the pulse train laser beam, an intense stimulated emission of X-ray is produced in the resonance system.

An X-ray laser generating apparatus according to the present invention comprises a laser oscillator for generating a pulse laser beam, a pulse train converter for converting the pulse laser beam to a pulse train laser beam, an optical device for focusing the pulse train laser beam to a thin line, a target material placed at the laser beam focused position and generating high temperature plasma containing highly charged ions with irradiation of the linearly focused pulse train laser beam, a vacuum chamber for keeping the vicinity of the irradiated region of the target material under a decompressed state, and a pair of X-ray reflecting mirrors positioned on both sides of the target material and on the extended thin line. At least one of the paired mirrors partially transmits X-ray.

With this apparatus, use of the pulse train laser beam yields two technical elements that the plasma creation efficiency is enhanced and that the intense X-ray resonance is generated by the increased number of the X-ray round trip between the paired mirrors. These elements are effectively combined and utilized, thus remarkably enhancing the efficiency of X-ray laser generation. As a result, the apparatus of the present invention needs no electric discharge which is required additionally to the small-sized laser oscillator in the technique of Japanese Laid-Open Patent Application No. 6-275893, thus permitting X-ray laser generation only with the energy from laser beam.

A method of generating X-ray laser according to the present invention comprises the steps of keeping a target material under a decompressed atmosphere to generate high temperature plasma containing highly charged ions with laser beam irradiation, repeatedly irradiating a thin linear region on the surface of the target material with a laser beam at short time intervals, resonating X-ray generated along the thin linear region by enclosing the generated X-ray between a pair of X-ray reflecting mirrors, and outputting the resonated X-ray by making it transmitted through at least one of the X-ray reflecting mirrors.

This method combines the above-described two phenomena that the long-term intermittent energy application provides a higher plasma-creation efficiency than the energy application at a short time and that intense resonance is generated by the increased number of X-ray round trip between the paired mirrors, thus permitting X-ray laser generation with a small-sized laser oscillator.

As schematically illustrated in FIG. 3(B), it is preferable to weaken the intensity of latter half pulses $31b$ of a pulse train laser beam 31 compared with that of former half pulses $31a$ thereof.

By thus weakening the intensity of the latter half pulses $31b$, plasma density and electron temperature each yielding a great gain are obtained substantially at the same time, thus providing an extremely great gain as a whole. This phenomenon is disclosed in detail by the inventors of the present invention in Japanese Laid-Open Patent Publication No. 7-94296. One of the advantages of the present invention is that by using the weak intensity pulse train laser beam 31 in the latter half pulses 31b, not only plasma creation efficiency is enhanced but also a state with great gain is continued long so that an intense resonance can be produced in the resonance system constituted by the paired mirrors, thus obtaining an intense X-ray laser. By utilizing this phenomenon, the inventors succeeded in the generation of X-ray laser by using a combination of the pulse train laser beam and the paired reflecting mirrors.

Further in this invention, as schematically illustrated in FIG. 4, a spatially expanded laser beam 40 is preferably divided into a plurality of laser beam portions 41, 42, 43 and so on to be then superposed together in the vicinity of or directly on the target surface.

With this construction, beam intensity is evenly distributed in a longitudinal direction of the focused thin line 46. A practical manner in which the laser beam portions 42 and 44 are superposed is omitted in FIG. 4. Further, each laser beam portion is preferably focused simultaneously to a thin line 46.

Further, as schematically illustrated in FIG. 5, an optical device for focusing the laser beam to the thin line preferably forms an interference pattern in the line 46. FIG. 5 schematically illustrates a manner in which a plurality of bright fringes 51, 52 and so on are formed in the line 46. With this construction, high electron temperature can be obtained in the bright fringes 51, 52 and so on to enable X-ray laser to be outputted at high efficiency.

The X-ray reflecting mirror for not only reflecting X-ray to be resonated but also partially transmitting X-ray to be outputted is realized by forming a transmitting window offset from a center of the X-ray intensity distribution. Instead, the mirror may be constructed by a mirror base with a multilayer film coated on the surface thereof and with a transmitting hole formed on a part of the base. The X-ray reflecting mirror which partially transmits X-ray may be provided on one side or both sides of the target material.

Either one of a YAG laser oscillator, an excimer laser oscillator, and a glass laser oscillator can be used as a pulse laser oscillator. Each laser oscillator is a small-sized type and is available at low cost.

Minute irregularities are preferably formed on the target surface to irregularly reflect the irradiated pulse train laser beam. These irregularities prevent the total reflection of the pulse train laser beam on the target surface.

It is extremely preferable to provide, at a pulse train laser beam incident portion of the vacuum chamber, a device for preventing access of scattered matter from the target material. Further, it is extremely preferable to provide, in the vicinity of the X-ray reflecting mirrors, a device for preventing adhesion of the scattered matter from the target material to the reflecting surface of the mirrors. Provision of the access- or adhesion-preventing device permits repeated operations of the X-ray laser generating apparatus for a long time.

The present invention will be more fully understood from the following detailed description and appended claims when taken with the accompanying drawings.

DETAILED DESCRIPTION OF THE PREFERRED EMBODIMENT

Figure 6:
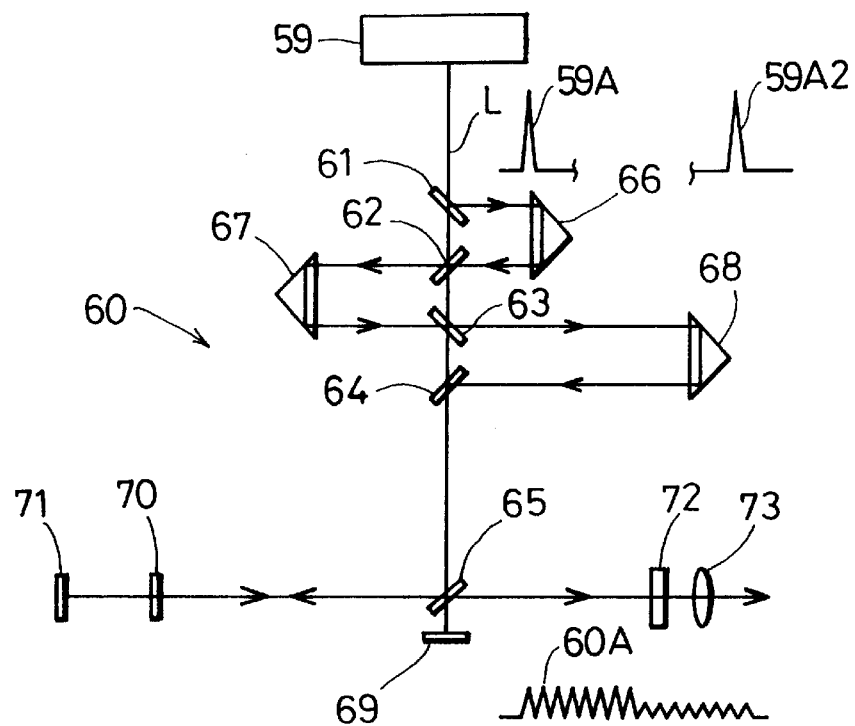
FIG. 6 is a schematic view illustrating a system for converting a pulse laser beam to a pulse train laser beam.

FIG. 6 schematically illustrates a pulse laser oscillator 59 for generating a pulse laser beam and a converter 60 for converting a pulse laser beam 59A generated by the pulse laser oscillator 59 into a pulse train laser beam 60A. A YAG laser oscillator can be used as a pulse laser oscillator 59. Other than the above, an excimer laser oscillator, a glass laser oscillator, a Li-SAF laser oscillator, a Ti-Sapphire laser oscillator, an alexsandrite laser oscillator, an $N_2$ laser oscillator and the like can be used. These laser oscillators can also be used in combination with crystals of non-linear optical materials such as BBO and LBO.

The converter 60 is constituted by beam splitters shown by numerals 61 to 65, prisms by 66–68, total reflecting mirrors by 69 and 71, and a filter by 70. The pulse laser beam 59A enters the beam splitter 61 and is split into two different directions. One beam directly enters another beam splitter 62, and the other beam is perpendicularly reflected to enter the prism 66. The pulse beam which enters the prism 66 is returned to the beam splitter 62. The pulse beam passing through the prism 66 goes later than the pulse beam directly goes to the beam splitter 62. Specifically, 2-pulse train laser beam enters the beam splitter 62. The beam splitter 62 splits the pulse beam directly reaching from the beam splitter 61 and then the other pulse beam from the prism 66 into two directions each. Therefore, 4-pulse train laser beam enters into the beam splitters 63. Similarly, 8-pulse train laser beam enters the beam splitter 65. Each pulse beam of the 8-pulse train laser beam is split into two directions. Finally, 16-pulse train laser beam 60A is obtained depending on the difference of the beam traveling distances to the reflecting mirrors 69 or 71. In FIG. 6, numeral 70 is a filter provided to lower the intensity of the latter eight pulses reflected by the mirror 71 compared with the intensity of the former eight pulses reflected by the mirror 69. Thus, the converter 60 converts a single-pulse laser beam 59A into a-sum-of-16-pulse train laser beam 60A wherein the intensity of latter eight pulses are adapted to be lower than that of the former eight pulses. This phenomena of converting the pulse laser beam into the pulse train laser beam occurs every time the pulse laser beams 59A, 59A2 and so on are emitted from the pulse laser oscillator 59. Specifically, the 16-pulse train laser beam is produced by the pulse laser 59A and another 16-pulse train laser beam is produced by the pulse laser beam 59A2. In the present invention, the practical laser beam irradiation time is extended by the conversion of the single-pulse laser beam into the 16-pulse train laser beam. In this embodiment, about 4 ns irradiation time is obtained by the 16-pulse train laser beam.

Figure 1:
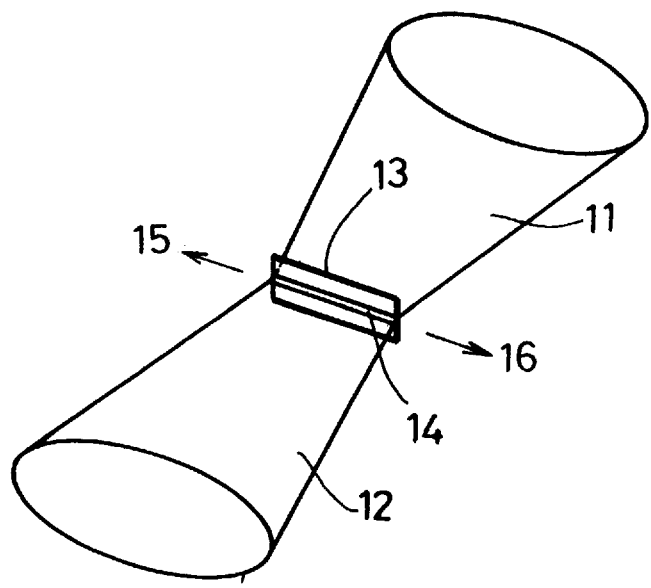
FIG. 1 is a schematic view illustrating a conventional method of generating X-ray laser.
Figure 2:
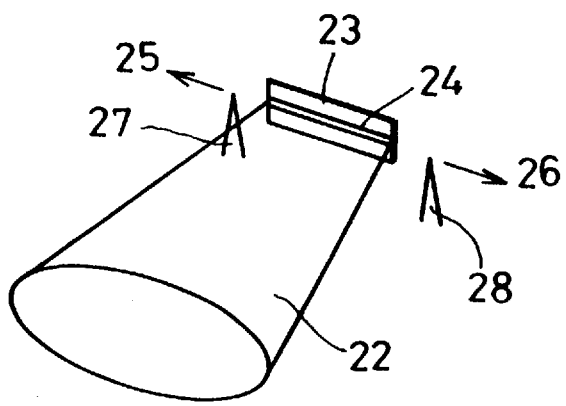
FIG. 2 is a schematic view illustrating another conventional method of generating X-ray laser.
Figure 3A:
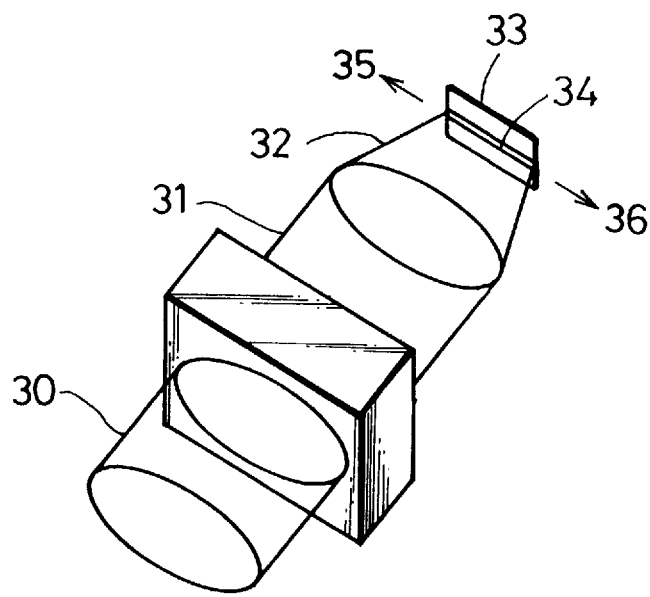
FIGS. 3(A) and 3(B) are schematic views illustrating an embodiment of the present invention.
Figure 3B:
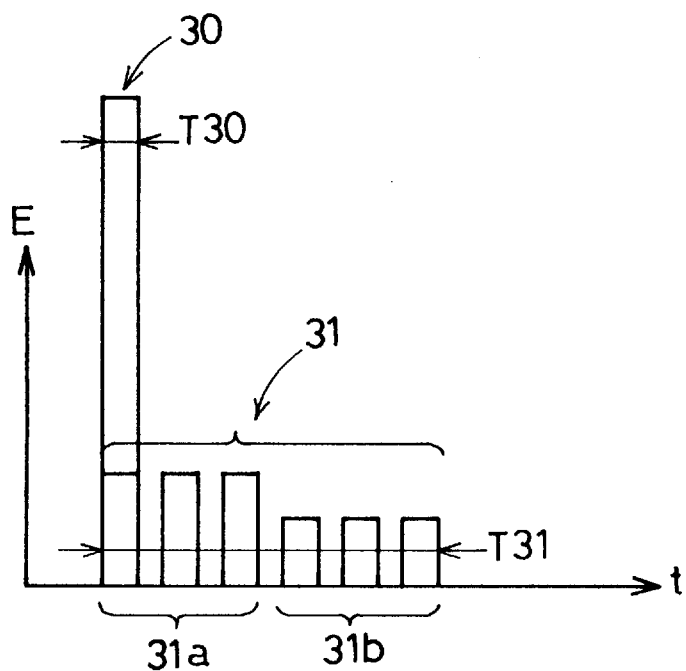
Figure 4:
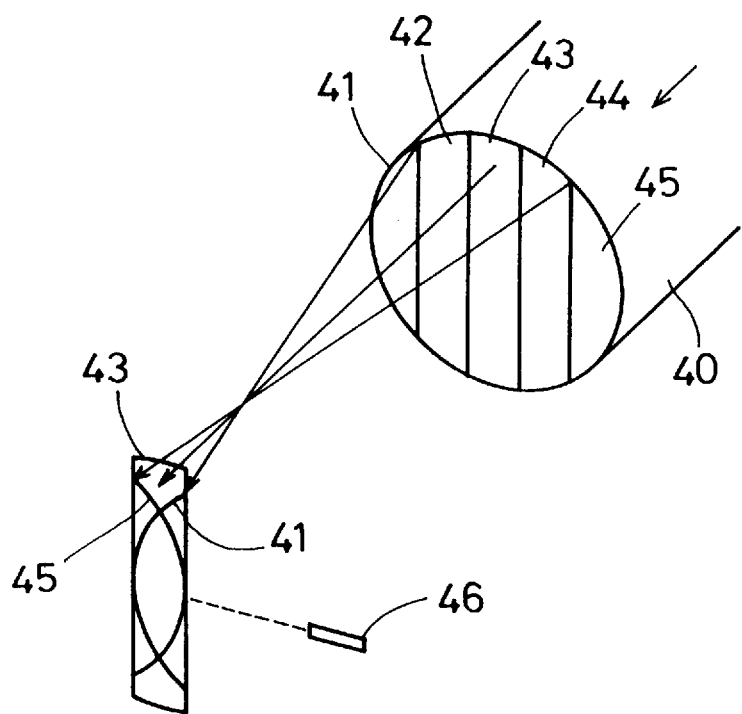
FIG. 4 is a schematic view illustrating another embodiment of the present invention.
Figure 7:
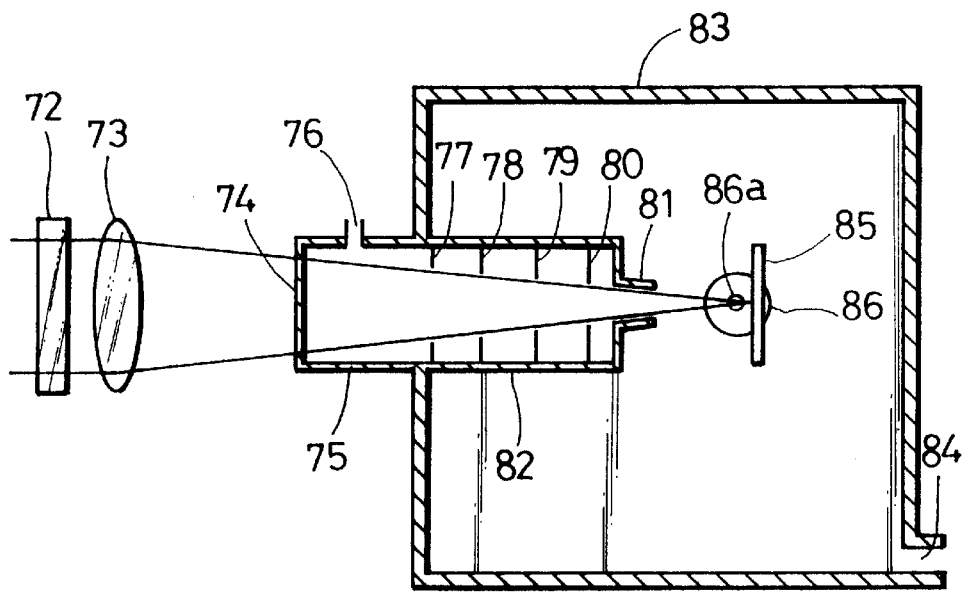
FIG. 7 is a vertical sectional view of a vacuum chamber viewed from a side thereof.
Figure 8:
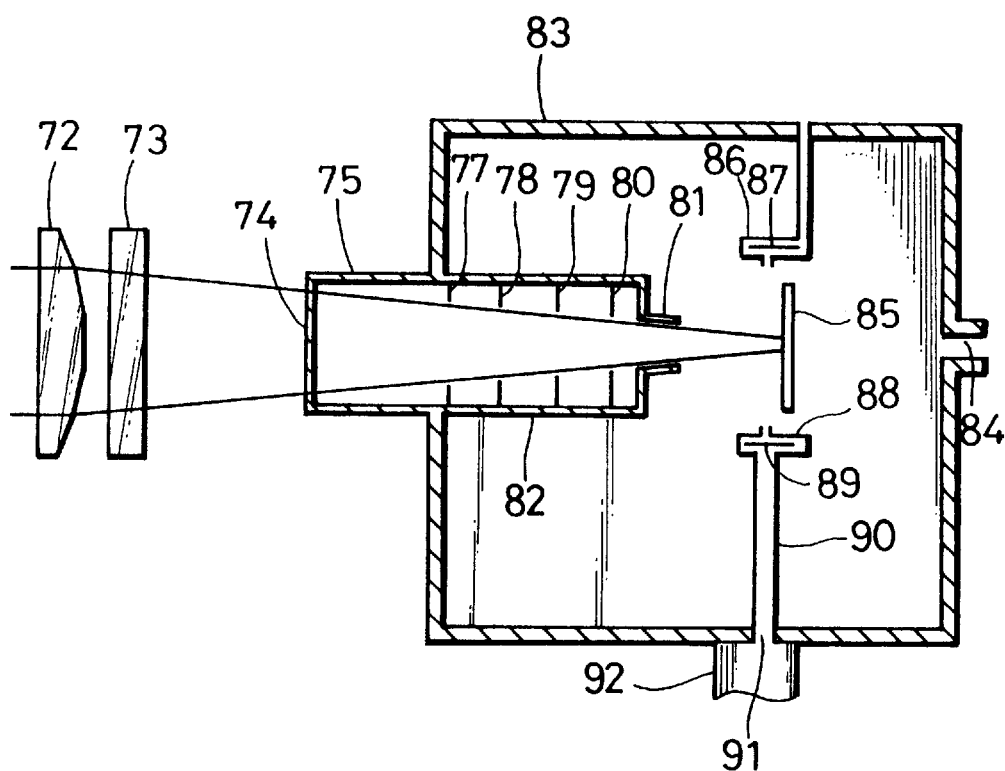
FIG. 8 is a cross-sectional view of the vacuum chamber viewed from the upper side thereof.
Figure 9:
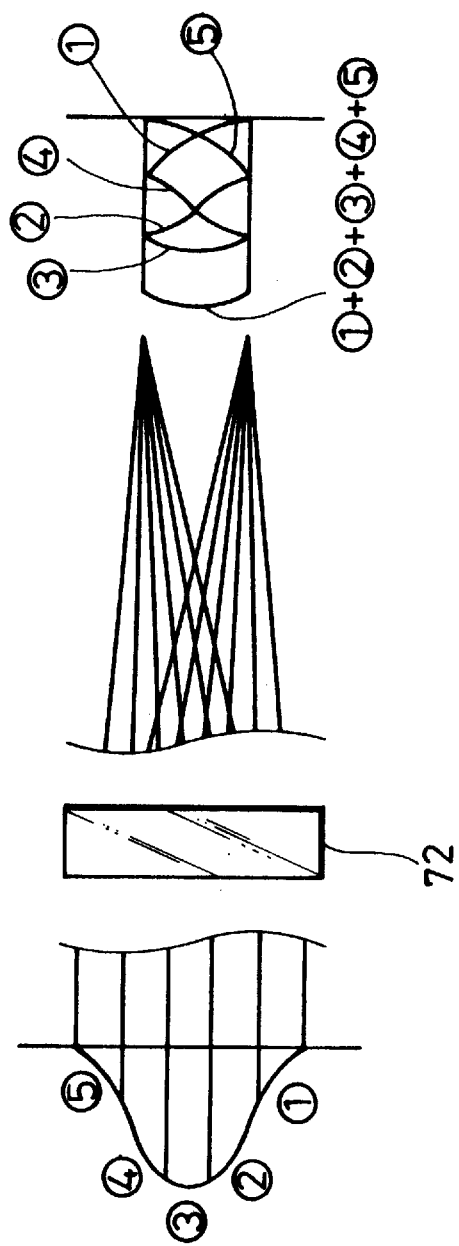
FIG. 9 is an explanatory view illustrating a superposition of laser beam portions.

The 16-pulse train laser beam enters a vacuum chamber 83 via a prism 72 and a lens 73. FIG. 7 illustrates a cross-section of the vacuum chamber 83 viewed from a horizontal direction, and FIG. 8 illustrates a cross-section thereof viewed from a perpendicular direction. The lens 73 is a cylindrical lens for focusing each laser beam of the pulse train laser beam 60A to a thin line. As illustrated in FIGS. 8 and 9, the prism 72 is a dividing prism divided in a horizontal plane. As schematically illustrated in FIG. 4, the laser beam is split into five laser beam portions and then superposed by the prism 72. The prism 72 superposes the divided laser beam portions at a surface of a target material 85, and the lens 73 focuses the laser beam at the surface of the target material 85. The linearly focused laser beam is 150 μm in width and 11 mm in length.

The entire chamber 83 is a sealed container and is kept under a decompressed state by a vacuum pump connected to a port 84. On a side of the chamber 83 where the pulse train laser beam 60A enters, a glass window 74 is provided for the incidence thereof. The chamber 83 has therein the target material 85 which generates high-temperature plasma containing highly charged ions by the irradiation of the pulse train laser beam 60A. As the target material, an aluminum plate 85 is used in this embodiment, but it may be replaced by magnesium, silicon, calcium and like materials. The prism 72 and the lens 73 constitute an optical unit for focusing the pulse train laser beam 60A to a thin line at the surface of the aluminum plate 85 used as a target material. When the focused pulse train laser beam intermittently irradiates the surface of the aluminum plate 85, plasma and other scattered matter are produced from the surface. When the scattered matter is adhered to the glass window 74, the intensity of the entered pulse train laser beam 60A is weakened. In order to prohibit the scattered matter from accessing to the glass window 74, this embodiment provides a device which includes a cylindrical wall 75 and 82, a nozzle 81, and baffles 77 to 80 and which forces a rare gas supplied from a port 76 to flow in a direction toward the nozzle 81. The baffles 77 to 80 add resistance to gas flow and avoid excessive amount of gas flowing into the chamber 83 wherein an insufficient vacuum degree may be caused by the excess-gas-inflow. The baffles 77 to 80 also serve to make the scattered matter adhered thereto when the scattered matter is collided with the rare gas and deviated from a path to the glass window 74. The scattered matter is trapped by the baffles 77 to 80, thus being prohibited from accessing to the glass window 74.

The aluminum plate 85 or a target material generates high temperature plasma containing high charged ions with irradiation of the focused laser beam. In this case, the aluminum plate 85 is repeatedly (namely, intermittently) irradiated with the pluses of the pulse train laser beam 60A, thus generating high temperature plasma compared with the case where an intense single pulse laser beam is irradiated in a short period of time, when irradiated energy gross is the same. In order to enhance plasma-creation efficiency with the repeated irradiation of the pulse train laser beam, a subsequent pulse of the pulse train has to be irradiated before the electron temperature has been lowered. In FIG. 6, a time interval from the pulse 59A to the pulse 59A2 is too long to obtain the above-described synergism. In the recombining plasma scheme, a popolation inversion will take place in a strongly recombining state of plasmas. Therefore, the control of plasma production and recombination process is important to increase pumping efficiency of X-ray lasers. In this embodiment, the electron temperature is raised high while the plasma is expanded with the irradiation of a series pulses of the pulse train laser beam 60A. The other advantages of the pulse-train laser is that the electron temperature drops rapidly as soon as laser beam irradiation ceases, because the fall time of the train laser is same as the of the last short pulse. Thererfore the use of a pulse-train laser is a powerful method to achieve high gain through recombination process. Two ideas are proposed in this embodiment to effectively bring about the stimulated emission to efficiently obtain X-ray.

One of the ideas is to weaken the intensity of latter half pulses of the pulse train laser beam 60A than that of former half pulses thereof. Both the electron temperature and the plasma density decrease simultaneously with termination of the irradiation of 16 pulses of the pulse train laser beam 60A.

Here, the electron temperature decreases more rapidly. On the other hand, in order to obtain an efficient X-ray emission, both the plasma density and the electron temperature have to be within respective predetermined ranges at the same time. If 16 pulses of the pulse train laser beam 60A have the same intensity, the electron temperature has not been sufficiently decreased when the plasma density reaches an optimum range, thus prohibiting efficient emission of X-ray. As can be seen in this embodiment, the intensity of the former half of the pulse train laser beam 60A is controlled to be stronger than the latter half thereof, an optimum plasma density and electron temperature which cause X-ray to be efficiently emitted are obtained substantially at the same time, thus permitting intense X-ray radiation.

Further, in this embodiment, a pair of X-ray reflecting mirrors 87 and 89 are provided at the extended ends of the thin linear irradiation region on the target material (the aluminum plate 85) such that X-ray resonance is produced between the paired mirrors 87 and 89.

Further, it is interesting that the conversion of the single pulse laser beam into the pulse train laser beam extends duration of the practical irradiation and further extends duration of the X-ray emission from the plasma, thus increasing the number of X-ray round trip between the paired mirrors to cause the intense X-ray resonance.

Thus, in this embodiment, with the above-described two ideas, the inventors of the present invention succeeded in generating X-ray laser only by energy from a small-sized laser oscillator 59.

Figure 10:
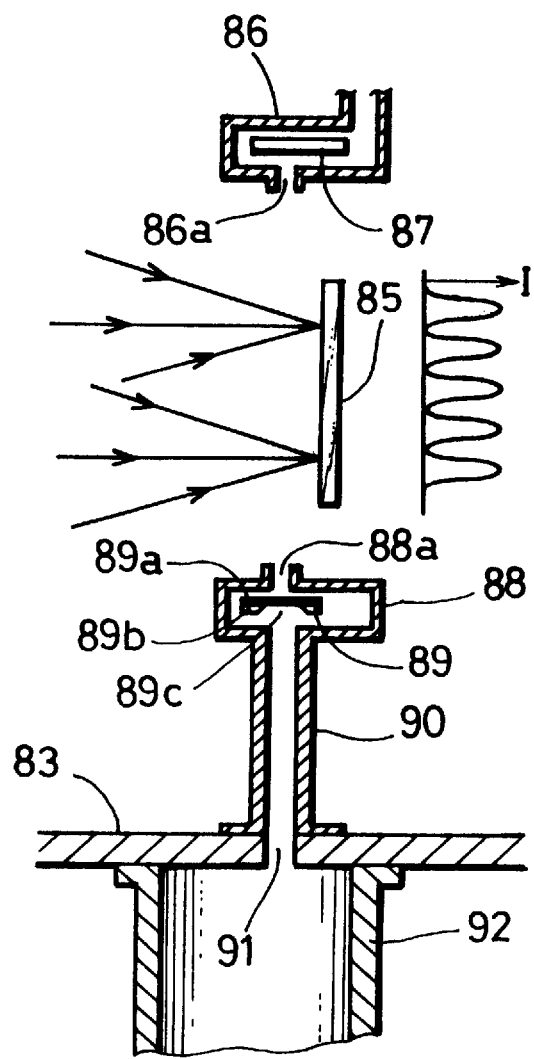
FIG. 10 is an enlarged view illustrating a part in the vicinity of a target material.

It should be noted that intense resonance is hard to be produced if the scattered matter from the target material is adhered to the surface of the X-ray reflecting mirrors. To solve the problem, as illustrated in FIG. 10, one reflecting mirror 87 is enclosed with a cover 86 having a pin hole 86a into which rare gas is blown. The rare gas is blown off from the pin hole 86a. Similarly, the other mirror 89 is enclosed with a cover 88 having a pin hole 88a into which a rare gas is blown. The cover 88 connects to a transmitting hole 91 disposed in the chamber 83 and from which X-ray laser is outputted. A tube 92 is fixed on the external wall of the chamber 83 and is filled with the decompressed rare gas. The X-ray laser apparatus is operated while a test piece is positioned in the tube 92 to be irradiated with X-ray laser.

As illustrated in FIG. 9, the dividing prism 72 divides the spatially expanded laser beam into five portions which are then superposed on or in the vicinity of the target surface. A curve in FIG. 9 illustrates an intensity distribution of the laser beam. As can be seen, the light intensity is strong in the center and weak in the outer periphery. As shown in a curve at a right side of FIG. 9, the superposition of 5-divided portions makes a beam profile uniform, thus providing a uniform intensity in a longitudinal direction of the thin linear irradiation region.

Figure 5:
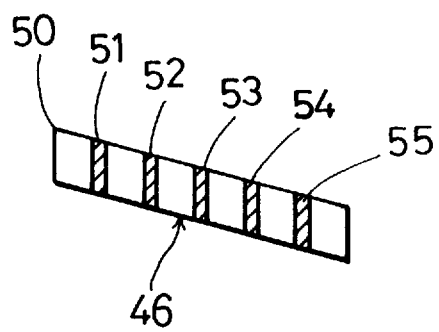
FIG. 5 is a schematic view illustrating a further embodiment of the present invention.

Other than making the intensity distribution uniform along the longitudinal direction as described above, the dividing prism 72 produces interference pattern in the thin line as illustrated in FIG. 5. X-ray radiant efficiency is enhanced by adjusting the laser beam to have a uniform intensity distribution as a whole in the thin line and to also produce bright and dark pattern therein.

Preferably, minute irregularities are formed on the surface of the target material (an aluminum plate 85 in this embodiment) so that the surface may irregularly reflect the laser beam. In this embodiment, the surface of the aluminum plate 85 is worked by rubbing with sandpaper to prevent total reflection of the laser beam.

The reflecting mirror 89 for partially reflecting and partially transmitting X-ray has, as illustrated in FIG. 10, a mirror base 89b (silicon plate, for example) whose surface is coated by vapor disposition with a multilayer film 89a of tungsten and silicon or molybdenum and silicon. The central part of the base 89b is formed with a hole 89c for transmission. The central part of the mirror 89 is constituted only by the multilayer film by which X-ray is partially transmitted and partially reflected.

The above mirror can be replaced by a total reflecting mirror through which a transmitting hole is directly bored to be positioned slightly apart from the center of X-ray intensity distribution. Also with this construction, it is possible to partially output X-ray to the outside of the mirror while resonating X-ray between the paired mirrors. This type of mirror may be used on either side or on both sides of the target material.

In this embodiment, rare gas is used to prevent adhesion of the scattered matter to the glass window 74 and the mirrors 87 and 89. The adhesion can also be prevented by providing, in front of each surface to be protected, a cover in which small cylinders are arranged in a honey-comb shape along the light-traveling direction. The cover transmits a laser beam and X-ray. On the other hand, the scattered matter adheres to the inside surfaces of the cylinders, thus avoiding adhesion to the reflecting or transmitting surface. Further, only by placing a plate with pin holes in front of the X-ray reflecting mirror, dirt on the reflecting surface is effectively suppressed.

This development provides a desk-type X-ray laser generator which realizes an X-ray microscope usable at hand in a laboratory if used together with an X-ray mirror which enables expansion and contraction of the X-ray images. Particularly, when the X-ray microscope is provided with a water-penetrating X-ray source called water window and having wavelengths of 23 to 44 Å, it will be possible to observe biological cells and DNAs in their vital state. Between the mirrors of the embodiment, a plurality of wavelengths of X-rays are observed. The X-ray laser generator of this invention is characterized in that the wavelength of X-ray is changeable by switching a plurality of X-ray resonance mirrors disposed in a vacuum container. By finding the difference of the two X-ray microscopic images of a sample separately recorded by the two different X-ray laser wavelengths, a spatial distribution of an element having an absorption edge between the two wavelengths can be observed with higher sensitivity than ever.

X-ray laser realizes an X-ray holographic device which permits observation of three-dimensional images of minute objects and measurement of deformation or displacement thereof in nanometer order. Further, X-ray is used for surface layer analysis by means of an X-ray photoelectron spectroscopy (XPS). However, with X-ray, a focused spot is large in diameter and the spatial resolution is limited to 7 micron at the minimum. Use of X-ray laser permits contraction of the focused spot, thus permitting realization of XPS having a high resolution around 0.1 micron. A surface analyzing device XPS with spatial resolution of submicron order has been looking forward to as an extremely important observation device to improve product finish in semiconductor factories and has been expected to build up a large market.

The most expected application of X-ray laser is an exposure system used for a VLSI lithography. With the current VSLI lithography exposure system, 16 M-bit memory devices are made by using mercury-i-spectral-line with a wavelength of 365 nm as a light source. However, for a next generation exposure system, it has been studied to make memory devices up to 1 G bits by using a KrF excimer laser (wavelength 248 nm). If using X-ray laser, circuit patterns can be contracted by the X-ray mirrors as mentioned above. For example, one-fifth contraction of a pattern dimension of 0.5 micron needs about 4 G-bit memory. This contraction-projection type X-ray lithography system using X-ray laser is expected as a post-next-generation lithography system.

In this invention, excitation of atoms is repeatedly performed by pulses of a pulse train laser beam instead of being performed once by a single pulse laser beam. Thus, the plasma is efficiently produced and the inversion population is ensured to last long. In addition, by using a pair of X-ray reflecting mirrors, strong X-ray resonance is produced because of an extended life of population inversion, thus producing X-ray laser. Enhancement in efficiency is aimed as mentioned above so that energy of the laser beam can be efficiently used for generating X-ray laser, thus succeeding in the generation of X-ray laser only by the energy from a small-sized laser beam oscillator. According to the present invention, semiconductor processing devices and analyzers using X-ray laser can be made in small-size and at low cost, thus permitting more practical minute working or analysis.

While the invention has been described with reference to preferred embodiments thereof, it is to be understood that modifications or variations may be easily made without departing from the scope of the present invention which is defined by the appended claims.

What is claimed is:

1. An X-ray laser generating apparatus comprising:
   a laser oscillator for generating a pulse laser beam;
   a pulse train converter for converting said pulse laser beam into a pulse train laser beam;
   an optical device for focusing said pulse train laser beam to a thin line;
   a target material placed at the laser beam focused position and generating high temperature plasma containing highly charged ions with irradiation of said linearly focused pulse train laser beam;
   a vacuum chamber for keeping a vicinity of said irradiated region of said target material under a decompressed state; and
   a pair of X-ray reflecting mirrors positioned on both sides of said target material and on the extended thin line, at least one of said paired mirrors partially transmitting X-ray.

2. The X-ray generating apparatus as defined in claim 1, wherein said pulse train converter weakens the intensity of latter half pulses of said pulse train laser beam compared with that of former half pulses thereof.

3. The X-ray generating apparatus as defined in claim 1, wherein said optical device divides a spatially expanded laser beam into a plurality of portions and then superposes the divided portions on or in the vicinity of said target surface.

4. The X-ray generating apparatus as defined in claim 1, wherein said optical device further forms an interference pattern in said thin line.

5. The X-ray generating apparatus as defined in claim 1, wherein said X-ray reflecting mirror partially transmitting X-ray has a transmitting window formed at a position off-set from a center of an X-ray intensity distribution.

6. The X-ray generating apparatus as defined in claim 1, wherein said X-ray reflecting mirror partially transmitting X-ray is constituted by a mirror base and a multilayer film coated on the surface thereof with a transmitting hole formed on a part of the base.

7. The X-ray generating apparatus as defined in claim 1, wherein said laser oscillator is either of a YAG laser oscillator, an excimer laser oscillator, and a glass laser oscillator.

8. The X-ray generating apparatus as defined in claim 1, wherein the surface of said target material is formed with minute irregularities to irregularly reflect the irradiated pulse train laser beam.

9. The X-ray generating apparatus as defined in claim 1, means for preventing access of scattered matter from said target material is provided at a pulse train laser beam incident portion of said vacuum chamber.

10. The X-ray generating apparatus as defined in claim 1, means for preventing adhesion of scattered matter from said target material to said reflecting surface of said X-ray reflecting mirrors is provided in the vicinity of said mirror.

11. A method of generating X-ray laser comprising the steps of:

keeping a target material, which generates high temperature plasma containing highly charged ions by irradiating laser beam, under a decompressed atmosphere;

repeatedly irradiating the laser beam at a thin linear region on the surface of said target material at short time intervals;

resonating X-ray generated along said thin linear region by enclosing the generated X-ray between a pair of reflecting mirrors; and outputting said X-ray laser generated by resonance by making it transmitted through at least one of the X-ray reflecting mirrors.

* * * * *